(12) United States Patent
Umeda et al.

(10) Patent No.: US 7,042,707 B2
(45) Date of Patent: May 9, 2006

(54) MULTILAYER CERAMIC CAPACITOR

(75) Inventors: Yuji Umeda, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/971,043

(22) Filed: Oct. 25, 2004

(65) Prior Publication Data

US 2005/0088803 A1    Apr. 28, 2005

(30) Foreign Application Priority Data

Oct. 24, 2003    (JP) .............................. 2003-365087

(51) Int. Cl.
   *H01G 4/06*    (2006.01)
(52) U.S. Cl. .............. 361/321.2; 361/321.4; 361/321.5; 501/138
(58) Field of Classification Search ............ 361/306.3, 361/311–313, 320, 321.2, 321.3, 321.4, 321.5, 361/322; 501/134–139
See application file for complete search history.

(56) References Cited

U.S. PATENT DOCUMENTS

| 5,319,517 A * | 6/1994 | Nomura et al. .......... 361/321.4 |
| 6,404,616 B1 * | 6/2002 | Mizuno .................... 361/306.3 |
| 6,489,257 B1 * | 12/2002 | Hiramatsu et al. .......... 501/135 |
| 6,673,461 B1 * | 1/2004 | Chazono et al. ............ 428/469 |

FOREIGN PATENT DOCUMENTS

| JP | A-09-035985 | 2/1997 |
| JP | A-2001-316114 | 11/2001 |

* cited by examiner

*Primary Examiner*—Anthony Dinkins
(74) *Attorney, Agent, or Firm*—Oliff & Berridge, PLC

(57) ABSTRACT

A multilayer ceramic capacitor having internal electrode layers and dielectric layers, wherein a thickness of said dielectric layer is 2.0 μm or less, and an average particle number per one dielectric layer obtained by dividing the thickness of said dielectric layer by an average particle diameter of dielectric particles composing said dielectric layer is 3 or more and 6 or less.

13 Claims, 1 Drawing Sheet

MULTILAYER CERAMIC CAPACITOR

BACKGROUND OF THE INVENTION

1. Field of the Invention

The present invention relates to a multilayer ceramic capacitor, and particularly relates to a multilayer ceramic capacitor ready for a small size and large capacity.

2. Description of the Related Art

A multilayer ceramic capacitor as an example of electronic devices is produced, for example, by printing a predetermined pattern of internal electrodes on a ceramic green sheet made by a predetermined dielectric ceramic composition, stacking a plurality of the results, then unifying the same, and cofiring a thus obtained green chip. It is necessary that a material which does not react with a ceramic dielectric has to be selected for the internal electrode layer of the multilayer ceramic capacitor so as to be unified with the ceramic dielectric by firing. Therefore, costly precious metals, such as platinum and palladium, had to be used as the material composing the internal electrode layer.

However, in recent years, a dielectric ceramic composition wherein an inexpensive base metal, such as nickel and copper, can be used has been developed and a major cost reduction has been realized.

Also in recent years, a demand for a more compact electronic device has become high along with an electronic circuit becoming high-density, and a multilayer ceramic capacitor has been rapidly becoming more compact and higher in capacity. To respond to the demand, there has been used a method of making a thickness of one dielectric layer thinner in a multilayer ceramic capacitor.

However, when a dielectric layer is made thinner, there arises a disadvantage that a short-circuiting defective of a multilayer ceramic capacitor is frequently caused. To solve the disadvantage, there is a method of making dielectric particles finer. However, when dielectric particles are made finer, the permittivity largely declines. Accordingly, it has been considered to be difficult to suppress short-circuiting defectives and obtain a high permittivity when dielectric layers are made thinner.

As a method of solving the above disadvantages, the Japanese Unexamined Patent Publication No. 2001-316114 discloses a method below. According to the article, the above disadvantages are solved by making a particle diameter of an oxide having the perovskite structure, such as barium titanate, to 0.03 to 0.2 µm.

However, in the invention disclosed in the article, particularly in the invention disclosed in the examples, fine barium titanate raw powder is used, and when such barium titanate raw powder is used, additional subcomponent materials are hard to be dispersed when producing a dielectric paste, so that the subcomponent materials have to be easily dispersible. Furthermore, in the examples of the article, a relatively large quantity of Mg is contained as a subcomponent. Since Mg generally has a function of suppressing a peak of a permittivity at the Curies point of barium titanate, an increase of the adding quantity of Mg may lead to a problem in the temperature characteristic, particularly the temperature characteristics on the high temperature side.

Also, the Japanese Unexamined Patent Publication No. 9-35985 discloses a ceramic multilayer electronic device wherein the ceramic particle number "n" (note that the ceramic particle number "n" is "thickness of the ceramic layer"/"average particle diameter of the ceramic particles") existing along the thickness direction of a ceramic layer positioned between internal electrodes is made to be less than 5. The article describes that, by configuring the ceramic multilayer electronic device as above, the delamination phenomenon, cracks and other structural defectives can be effectively prevented.

However, the ceramic multilayer electronic device, particularly the ceramic multilayer electronic device disclosed in the examples disclosed in the above Japanese Unexamined Patent Publication No. 9-35985 only refers to structural defectives, such as delamination and cracks and electric characteristics thereof are unknown. Furthermore, a thickness of a ceramic layer of the ceramic multilayer electronic device described in the examples is 5 µm, and the multilayer ceramic capacitor is hard to be compact and high in capacity with the thickness. Accordingly, in the article, when the dielectric layer (ceramic layer) is made thinner (for example, to 2.0 µm or less), a range of the particle number in the thickness direction in the dielectric layer to obtain a multilayer ceramic capacitor having preferable characteristics (for example, electric characteristics) is not known.

SUMMARY OF THE INVENTION

An object of the present invention is to provide a multilayer ceramic capacitor, wherein the short-circuiting defective rate is suppressed low, and a high permittivity, preferable temperature characteristic for satisfying the B characteristic and the X5R characteristic, and preferable DC bias characteristic are obtained, even when the capacitor is made thinner.

The inventors of the present invention have been committed themselves to study the multilayer ceramic capacitor wherein the short-circuiting defective rate is suppressed low, a permittivity is high, the temperature characteristic is preferable, and the DC bias characteristic is preferable, consequently, found that the object of the present invention can be attained by making the average particle number per one dielectric layer to 3 or more and 6 or less, and completed the present invention.

Namely, according to the present invention, there is provided a multilayer ceramic capacitor having internal electrode layers and dielectric layers, wherein a thickness of the dielectric layer is 2.0 µm or less, and an average particle number per one dielectric layer obtained by dividing the thickness of the dielectric layer by an average particle diameter of dielectric particles composing the dielectric layer is 3 or more and 6 or less.

In the multilayer ceramic capacitor according to the present invention, preferably, the dielectric layer includes a main component containing barium titanate; and as subcomponents, 0.1 to 3 moles of an oxide of Mg in terms of MgO, 0 to 0.5 mole of an oxide of Mn in terms of MnO, 0 to 0.5 mole of an oxide of V in terms of $V_2O_5$, 0 to 5 moles of an oxide of Y in terms of $Y_2O_3$, 2 to 12 moles of an oxide of Si in terms of $SiO_2$, and 2 to 12 moles of oxides of Ba and Ca in terms of (BaO+CaO) with respect to 100 moles of the main component.

Note that, in the present invention, "0 to 0.5 mole in terms of MnO" in a Mn oxide means more than 0 mole and 0.5 mole or less. This is the same in a V oxide and Y oxide.

Alternately, in the multilayer ceramic capacitor according to the present invention, preferably, the dielectric layer includes a main component containing barium titanate; and as subcomponents, 0.1 to 3 moles of an oxide of Mg in terms of MgO, 2 to 12 moles of an oxide of Si in terms of $SiO_2$, and 2 to 12 moles of oxides of Ba and Ca in terms of (BaO+CaO) with respect to 100 moles of the main component.

In the multilayer ceramic capacitor according to the present invention, a content of the Mg oxide in the subcomponents is preferably 0.1 to 3 moles, more preferably 0.1 to 0.5 mole, and furthermore preferably 0.1 to 0.3 mole in terms of MgO with respect to 100 moles of the main component. By setting the content of the Mg oxide in the above ranges, it is possible to improve the temperature characteristic of an electrostatic capacity of the capacitor, particularly the temperature characteristic on the high temperature side.

In the multilayer ceramic capacitor according to the present invention, preferably, the dielectric layer is produced by using as a material barium titanate powder having a specific surface area of 3 m$^2$/g or more and 10 m$^2$/g or less.

According to the present invention, even in the case where the dielectric layers of the multilayer ceramic capacitor are made thinner, for example, to 2.0 μm or less, by making an average particle number per one dielectric layer to 3 or more and 6 or less, it is possible to provide a multilayer ceramic capacitor wherein the short-circuiting defective rate is suppressed low, the high permittivity is obtained, a preferable temperature characteristic for satisfying the B characteristic and the X5R characteristic is obtained, and a preferable DC bias characteristic id obtained.

BRIEF DESCRIPTION OF DRAWINGS

Below, embodiments of the present invention will be explained based on the attached drawing, in which.

DESCRIPTION OF THE PREFERRED EMBODIMENT

Multilayer Ceramic Capacitor

Figure 1:
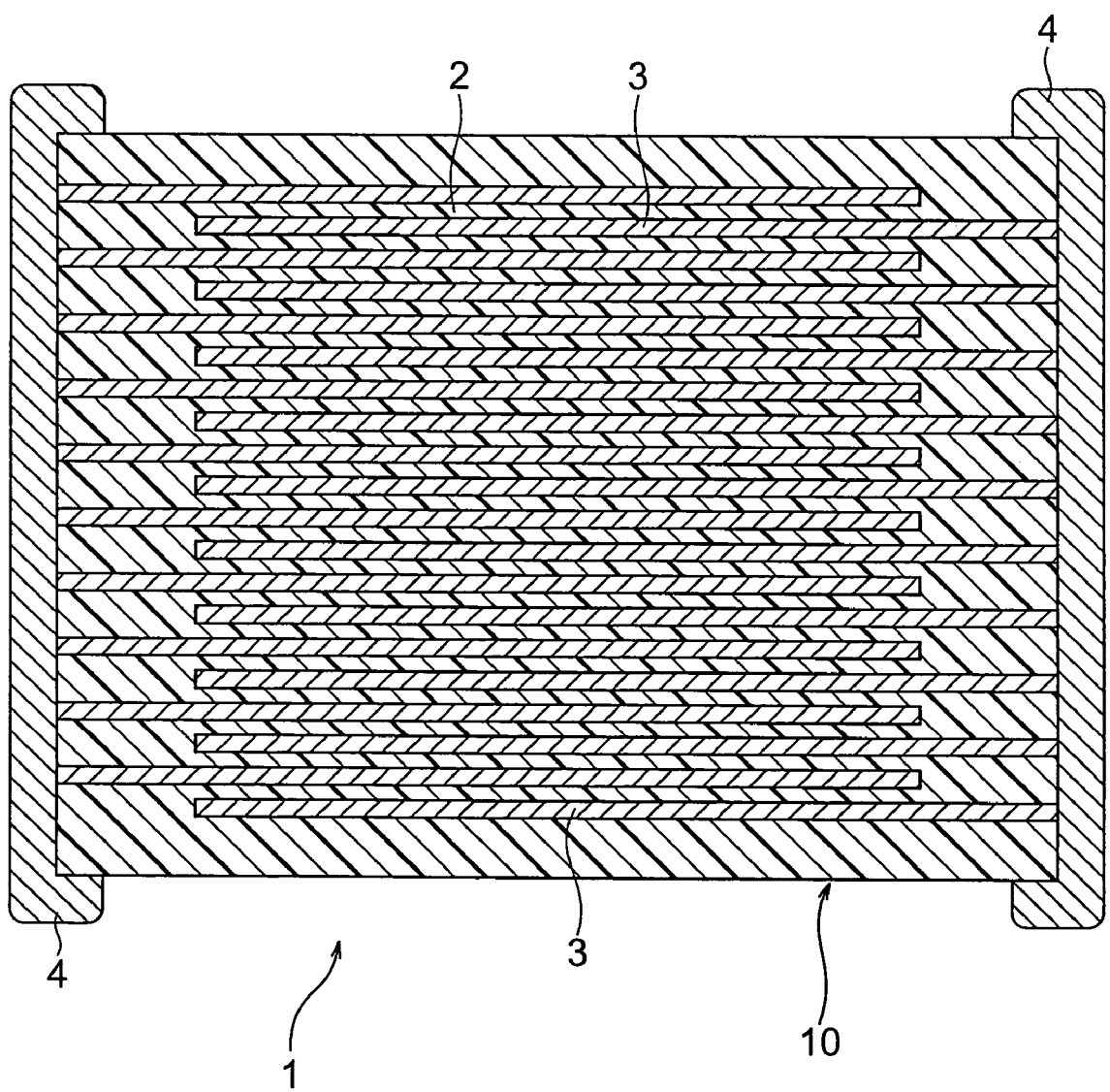
FIG. 1 is a sectional view of a multilayer ceramic capacitor according to an embodiment of the present invention.

As shown in FIG. 1, a multilayer ceramic capacitor 1 according to an embodiment of the present invention comprises a capacitor element body 10 configured by alternately stacking dielectric layers 2 and internal electrode layers 3. At both end portions of the capacitor element body 10, a pair of external electrodes 4 respectively conductive with the internal electrode layers 3 arranged alternately inside the element body 10 are formed. A shape of the capacitor element body 10 is not particularly limited but normally is a rectangular parallelepiped shape. Also, the size is not particularly limited and may be a suitable size according to the use object, but normally is (0.4 to 5.6 mm)×(0.2 to 5.0 mm)×(0.2 to 1.9 mm) or so.

The internal electrode layers 3 are stacked, so that the respective end faces are exposed alternately to surfaces of mutually facing two end portions of the capacitor element body 10. The pair of external electrodes 4 are formed at both end portions of the capacitor element body 10 and connected to the exposed end faces of the alternately arranged internal electrode layers 3 to configure a capacitor circuit.

Dielectric Layer 2

The dielectric layers 2 include a dielectric ceramic composition.

The dielectric ceramic composition preferably includes a main component containing barium titanate and subcomponents.

Preferably, the barium titanate is expressed by a composition formula $Ba_mTiO_{2+m}$, wherein "m" is $0.980 \leq m \leq 1.035$, and the ratio of Ba and Ti is $0.980 \leq Ba/Ti \leq 1.035$.

The subcomponents preferably contains an oxide of Mg, an oxide of Mn, an oxide of V, an oxide of Y, an oxide of Si, and oxides of Ba and Ca.

The Mg oxide has an effect of suppressing the permittivity peak at the Curie's point and suppressing grain growth, and preferably is 0.1 to 3 moles, more preferably 0.1 to 0.5 mole, and further preferably 0.1 to 0.3 mole in terms of MgO with respect to 100 moles of the main component. When the content of the Mg oxide is too small, abnormal grain growth is liable to be caused, while when too much, a temperature characteristic of an electrostatic capacity tends to decline. Also, by setting the content of the Mg oxide to the above ranges, the temperature characteristic of an electrostatic capacity of the capacitor, particularly the temperature characteristic on the high temperature side can be improved.

The Mn oxide has an effect of accelerating sintering, an effect of heightening the IR, and an effect of improving a high temperature load lifetime, and preferably is 0 to 0.5 mole in terms of MnO. When the content of the Mn oxide is too much, the specific permittivity tends to decline.

The V oxide has an effect of improving a high temperature load lifetime, and preferably is 0 to 0.5 mole in terms of $V_2O_5$ with respect to 100 moles of the main component. When the content of the V oxide is too much, the IR tends to be remarkably deteriorated.

The Y oxide mainly exhibits an effect of improving the high temperature load lifetime, and preferably is 0 to 5 moles in terms of $Y_2O_3$ with respect to 100 moles of the main component. When the content of the Y oxide is too much, the sintering property tends to decline.

Note that, in the present embodiment, "0 to 0.5 mole in terms of MnO" in the Mn oxide means more than 0 mole and 0.5 mole or less. This is the same in the V oxide and the Y oxide.

The Si oxide serves as a sintering auxiliary, and preferably is 2 to 12 moles in terms of $SiO_2$ with respect to 100 moles of the main component. When the content of the Si oxide is too small, the sintering property tends to decline, while when too much, the specific permittivity tends to decline.

Note that, when adding the Si oxide, it is preferable to add Ba and Ca oxides at a time, and is preferably added in a form of a compound oxide expressed by $(Ba, Ca)_x SiO_{2+x}$. By adding in a state where $SiO_2$, BaO and CaO are brought to react in advance, it is possible to hinder reaction of $SiO_2$ with $BaTiO_3$ and composition deviation near the $BaTiO_3$ particle surface can be prevented. The "x" in the $(Ba, Ca)_x SiO_{2+x}$ is preferably 0.8 to 1.2, and more preferably 0.9 to 1.1. When the "x" is too small, that is when $SiO_2$ is too much, $SiO_2$ reacts with barium titanate contained in the main component to deteriorate the dielectric characteristic, while when the "x" is too great, the melting point becomes higher to deteriorate the sintering property.

Note that, in the present specification, the respective oxides composing the main component and subcomponents are expressed by a stoichiometric composition, but oxidization states of the respective oxides may be out of the stoichiometric composition. Note that the ratios of the respective subcomponents are obtained by converting to the oxides of the above stoichiometric composition from the metal amount contained in the oxides composing the respective subcomponents.

A thickness of one dielectric layer 2 is 2.0 μm or less, and preferably 1.5 μm or less. The lower limit of the thickness is not particularly limited. In the present embodiment, even when the thickness of the dielectric layer 2 is made thinner to 2.0 μm or less, furthermore to 1.5 μm or less, it is possible to suppress the short-circuiting defective rate low and heighten the specific permittivity.

An average particle diameter of dielectric particles contained in the dielectric layers 2 is preferably 0.66 μm or less, and more preferably 0.4 μm or less. The lower limit of the average particle diameter is not particularly limited.

Also, in the present embodiment, an average particle number per one dielectric layer 2 obtained by dividing the thickness of the dielectric layer 2 by the average particle diameter of the dielectric particles composing the dielectric layer 2 is 3 or more and 6 or less.

Characteristics of the present invention is to make the dielectric layer thinner, for example, to 2.0 μm or less to make the average particle number per one dielectric layer to 3 or more and 6 or less. As a result thereof, it becomes possible to obtain a multilayer ceramic capacitor wherein the short-circuiting defective rate is suppressed low, a high specific permittivity is obtained, a preferable temperature characteristic to satisfy the B characteristic and the X5R characteristic is obtained and a preferable DC bias characteristic is obtained even when the dielectric layers are made thinner. When the average particle number per one dielectric layer is too small, the short-circuiting defective rate tends to become high, while when too great, the specific permittivity tends to be lower.

Also, the number of stacking layers of the dielectric layers 2 is not particularly limited and may be suitably determined in accordance with the use object, etc.

Internal Electrode Layer 3

A conductive material contained in the internal electrode layers 3 is not particularly limited but an inexpensive base metal can be used. As the base metal used as the conductive material, Ni or a Ni alloy is preferable. As a Ni alloy, an alloy of at least one kind of element selected from Mn, Cr, Co, Cu and Al with Ni is preferable, wherein a content of Ni in the alloy is preferably 95 wt % or more. Note that in Ni or Ni alloy, P or other trace of various components may be contained by about 0.1 wt % or less. A thickness of the internal electrode layer 3 may be suitably determined in accordance with the use object, etc., but normally is 0.1 to 3 μm, and particularly preferably 0.2 to 2.0 μm or so.

External Electrode 4

A conductive material included in the external electrodes 4 is not particularly limited, and inexpensive Ni and Cu, alloys of these, or an In—Ga alloy having a low melting point may be used in the present invention. A thickness of the external electrode 4 may be suitably determined in accordance with the use object, etc. but normally 10 to 50 μm or so is preferable.

Production Method of Multilayer Ceramic Capacitor

The multilayer ceramic capacitor of the present invention is produced in the same way as a multilayer ceramic capacitor of the related art: by producing a green chip by a normal printing method or sheet method using a paste, firing the same, printing or transferring external electrodes, and firing. Below, the production method will be specifically explained.

First, dielectric ceramic composition powder to be contained in the dielectric layer paste is prepared, and made the same to be paint to produce a dielectric layer paste.

The dielectric layer paste may be an organic based paint obtained by kneading the dielectric ceramic composition powder and organic vehicle or may be a water base paint.

The dielectric ceramic composition powder contains barium titanate powder as the main component material and subcomponent material powder. The barium titanate powder preferably has a specific surface area of 3 $m^2/g$ or more and 10 $m^2/g$ or less.

The specific surface area of the barium titanate powder as a main component material largely affects an average particle diameter and electric characteristics of sintered particles after firing, so that it is preferable that the specific surface area is made to be the above range, and the average particle diameter and electric characteristics of sintered particles are made to be predetermined ranges. When the specific surface area is too large, the average particle diameter may become small. In that case, an average particle number per one dielectric layer becomes large and the specific permittivity is liable to be declined. While, when the specific surface area is too small, the average particle diameter becomes large and the average particle value per one dielectric layer tends to be small, and the short-circuiting defective rate tends to be high.

As the dielectric ceramic composition powder, the above oxides and mixtures thereof, and compound oxides may be used, or a variety of compounds which become the above oxides or compound oxides by firing, for example, carbonates, oxalates, nitrates, hydroxides and organic metal compounds, etc. may be suitably selected and mixed for use. A content of each compound in the dielectric ceramic composition powder may be determined, so that the composition becomes the above dielectric ceramic composition after firing. A particle diameter of the dielectric ceramic composition powder normally is 0.01 to 0.5 μm or so as an average particle diameter in a state before made to be paint.

The organic vehicle is obtained by dissolving a binder in an organic solvent. The binder to be used for the organic vehicle is not particularly limited and may be suitably selected from normal binders, such as ethyl cellulose and polyvinyl butyral. Also, the organic solvent to be used is not particularly limited and may be suitably selected from a variety of organic solvents, such as terpineol, butylcarbitol, acetone, toluene, etc. according to the use method, such as a printing method and sheet method.

Also, when the dielectric layer paste is water base paint, a water base vehicle obtained by dissolving a water soluble binder or dispersant, etc. in water may be kneaded with the dielectric material. The water soluble binder to be used in the water base vehicle is not particularly limited and, for example, polyvinyl alcohol, cellulose, water soluble acrylic resin, etc. may be used.

The internal electrode paste is produced by kneading a conductive material composed of the above variety of conductive metals and alloys or various oxides, organic metal compounds and resonates, etc. which become the above conductive materials after firing with the above organic vehicle.

The external electrode paste may be produced in the same way as the above internal electrode paste.

A content of the organic vehicle in the above various pastes is not particularly limited and may be a normal content, for example, 1 to 5 wt % or so of a binder and 10 to 50 wt % or so of a solvent. Also, each paste may contain additives selected from a variety of dispersants, plasticizers, dielectrics, insulators, etc. in accordance with need. The total content thereof is preferably 10 wt % or less.

When using a printing method, the dielectric layer paste and the internal electrode paste are stacked by printing on a substrate, such as PET, cut to a predetermined shape, then, peeled from the substrate to obtain a green chip.

When using a sheet method, a dielectric layer paste is used for forming a green sheet, an internal electrode paste is printed thereon, then, the results are stacked to obtain a green chip.

The green chip is subjected to binder removal processing before firing. The binder removal processing may be suitably determined in accordance with a kind and amount of the binder in the dielectric paste and the internal electrode paste. For example, the oxygen partial pressure in the binder removal atmosphere is preferably $10^{-9}$ to $10^5$ Pa. When the oxygen partial pressure is less than the above range, the binder removal effect is declined. While when it exceeds the above range, the internal electrode layer tends to be oxidized.

Also, as other binder removal conditions, the temperature rising rate is preferably 5 to 300° C./hour, more preferably 10 to 100° C./hour, the holding temperature is preferably 180 to 400° C., more preferably 200 to 350° C., and the temperature holding time is preferably 0.5 to 24 hours, more preferably 2 to 20 hours. Also, the firing atmosphere is preferably in the air or in a reducing atmosphere. As an atmosphere gas in the reducing atmosphere, for example, a wet mixed gas of $N_2$ and $H_2$ is preferable.

The atmosphere of firing the green chip may be suitably determined in accordance with a kind of a conductive material in the internal electrode paste, etc. The oxygen partial pressure in the firing atmosphere is preferably $10^{-9}$ to $10^{-4}$ Pa when using Ni, a Ni alloy or other base metal as the conductive material. When the oxygen partial pressure is less than the above range, the conductive material in the internal electrode layer may be abnormally sintered and broken in some cases. Also, when it exceeds the above range, the internal electrode layer tends to be oxidized.

The holding temperature at firing is preferably 1000 to 1400° C. and more preferably 1100 to 1350° C. When the holding temperature is less than the above range, densification becomes insufficient, while when it exceeds the above range, breaking of electrodes due to abnormal sintering of the internal electrode layer, deterioration of the capacitance-temperature characteristic and short-circuiting rate due to dispersion of the internal electrode layer components, and reducing and abnormal grain growth of the dielectric ceramic composition are liable to be caused.

As other firing conditions, the temperature rising rate is preferably 50 to 500° C./hour, more preferably 100 to 300° C./hour, the temperature holding time is preferably 0.5 to 8 hours, more preferably 1 to 3 hours, and the cooling rate is preferably 50 to 500° C./hour, more preferably 100 to 300° C./hour. Also, the firing atmosphere is preferably a reducing atmosphere, and a wet mixed gas of $N_2$ and $H_2$ is preferably used as the atmosphere gas.

When firing in a reducing atmosphere, annealing is preferably performed on the capacitor element body. Annealing is processing for re-oxidizing the dielectric layer, and thereby, the electric characteristics, particularly a high temperature load lifetime can be remarkably enhanced, so that the reliability is improved.

The oxygen partial pressure in the annealing atmosphere is preferably $10^{-3}$ Pa or more, particularly $10^{-2}$ to 10 Pa. When the oxygen partial pressure is less than the above range, re-oxidization of the dielectric layer becomes difficult, while when it exceeds the above range, the internal electrode layer tends to be oxidized.

The holding temperature at annealing is preferably 1100° C. or less, and particularly 500 to 1100° C. When the holding temperature is less than the above range, oxidization of the dielectric layer becomes insufficient, so that the IR becomes low, and the electric characteristics, particularly high temperature load lifetime is liable to be short. On the other hand, when the holding temperature exceeds the above range, not only the internal electrode is oxidized to lower the capacitance, but the internal electrode undesirably reacts with the dielectric, so that deterioration of the capacitance-temperature characteristic, deterioration of the IR, and deterioration of the high temperature load lifetime are easily caused. Note that the annealing may be composed only of a temperature rising step and a temperature lowering step. Namely, the temperature holding time may be 0. In this case, the holding temperature indicates the highest temperature.

As other annealing conditions, the temperature holding time is preferably 0 to 20 hours, more preferably 2 to 10 hours, and the cooling rate is preferably 50 to 500° C./hour, more preferably 100 to 300° C./hour. Also, as an atmosphere of the annealing, for example, a wet $N_2$ gas, etc. is preferably used.

In the above binder removal processing, firing and annealing, to wet the $N_2$ gas or a mixed gas, etc., for example, a wetter, etc. may be used. In this case, the water temperature is preferably 5 to 75° C.

The binder removal processing, firing and annealing may be performed continuously or separately.

The multilayer ceramic sintered body obtained as explained above is subjected to end polishing, such as barrel polishing and sandblasting, applied, printed or transferred an external electrode paste, and subjected to firing if necessary, to form external electrodes 4. Firing conditions in the case of using an external electrode paste containing Ni, Cu or alloys of these as the conductive material are preferably, for example, at 300 to 800° C. for 10 minutes to 2 hours in a wet mixed gas of $N_2$ and $H_2$. Note that in the case of using an external electrode paste containing an In—Ga alloy as the conductive material, firing is not necessary when forming the external electrodes. A covering layer is formed by plating, etc. on surfaces of the external electrodes in accordance with need.

The multilayer ceramic capacitor of the present invention produced as above is mounted on a print substrate, etc. by soldering, etc. and used for a variety of electronic devices, etc.

According to the present invention, by making the average particle number per one dielectric layer 3 or more and 6 or less, it is possible to obtain a multilayer ceramic capacitor wherein the short-circuiting defective rate is suppressed low, the high specific permittivity is obtained, and a preferable temperature characteristic and a DC bias characteristic are obtained, even when the dielectric layers are made thinner, for example, to 2.0 μm or less.

An explanation was made on the embodiments of the present invention above, but the present invention is not at all limited to the above embodiments and may be variously modified within the scope of the present invention.

For example, in the above embodiments, a multilayer ceramic capacitor was taken as an example of electronic devices according to the present invention, but an electronic device according to the present invention is not limited to a multilayer ceramic capacitor and may be any as far as it includes a dielectric layer composed of a dielectric ceramic composition having the above composition.

Also, being different from the above embodiments, the subcomponents composing the dielectric ceramic composition may be configured not to include an oxide of Mn, an oxide of V and an oxide of Y.

EXAMPLES

Below, the present invention will be explained further in detail based on examples, but the present invention is not limited to the examples.

As a main component, $BaTiO_3$ materials having specific surface areas shown in Table 1 and Table 3 were prepared.

Note that the specific surface area of the $BaTiO_3$ was measured by the nitrogen absorption method (BET method). Next, the main component was added with MgO, MnO, $V_2O_5$, $Y_2O_3$, (Ba, Ca)$SiO_3$ as subcomponents, subjected to wet mixing by a ball-mill for 16 hours and dried to obtain a dielectric material. Adding quantities of the respective subcomponents are shown in Table 1 and Table 3 by mole values with respect to 100 moles of the main components.

The obtained dielectric material was added with polyvinyl butyral and ethanol based organic solvent, mixed again with a ball-mill, and made to be a paste, so that a dielectric layer paste was obtained.

Next, 44.6 parts by weight of Ni particles, 52 parts by weight of terpineol, 3 parts by weight of ethyl cellulose, and 0.4 part by weight of benzotriazole were kneaded with a three-roll mill, and made to be a slurry to obtain an internal electrode paste.

By using the pastes, a multilayer ceramic chip capacitor shown in FIG. 1 was produced as explained below.

By using the obtained dielectric layer paste, a green sheet was formed on a PET film by a doctor blade method. The internal electrode paste was printed thereon by a screen printing method. After that, the green sheet to be a cap was peeled off from the PET film, the green sheets to be cap were stacked to be a thickness of about 300 μm. Next, a desired number of sheets printed with the internal electrode paste (in this case, 5) were stacked thereon while peeling them from the PET film. Furthermore the green sheets to be a cap were stacked again and adhered by pressure to obtain a green chip.

Next, the green chip was cut to be a predetermined size, subjected to binder removal processing, firing and annealing under the conditions below, and a multilayer ceramic fired body was obtained. The binder removal processing conditions were the temperature rising rate of 32.5° C./hour, the holding temperature of 260° C., the temperature holding time of 8 hours, and the atmosphere was in the air. The firing conditions were the temperature rising rate of 200° C./hour, the holding temperature of 1230° C., the temperature holding time of 2 hours, the cooling rate of 200° C./hour and the atmosphere was in a wet mixed gas of $N_2+H_2$. The annealing conditions were the temperature rising rate of 200° C./hour, the holding temperature of 1050° C., the temperature holding time of 2 hours, the cooling rate of 200° C./hour and the atmosphere was in a wet $N_2$ gas. Note that a wetter with a water temperature of 20° C. was used for wetting the atmosphere gas at firing and annealing.

Next, end surface of the obtained multilayer ceramic fired body was polished by sandblast and applied with In—Ga as an external electrode, so that the multilayer ceramic capacitor samples 1 to 10 were obtained.

Dimensions of the obtained capacitor samples were 3.2 mm×1.6 mm×0.6 mm, the number of dielectric layers sandwiched by internal electrode layers were 4, and an average thickness of the internal electrode layers was 1.2 μm. Table 1 and Table 3 show an average thickness per one dielectric layer, an average particle diameter of dielectric particles, and an average particle number per one dielectric layer of each sample.

As a measuring method of the thickness of the dielectric layer, first, the obtained capacitor sample was cut at a face perpendicular to the internal electrodes, the cut face was polished, and the polished face was observed by a metal microscope at a plurality of points to obtain an average thickness of the dielectric layer after sintering.

As a measuring method of the average particle diameter of the dielectric particles, chemical etching was performed on the polished face, then, a scanning electron microscope (SEM) was used for observation, and calculation was conducted by a code method on an assumption that a shape of the dielectric particle was a sphere.

The average particle number per one dielectric layer was obtained from the thickness and the average particle diameter of the dielectric layer measured as above. Namely, it was calculated by dividing the thickness of the dielectric layer by the average particle diameter.

The obtained capacitor samples were measured to obtain the specific permittivity, the short-circuiting defective rate, the DC bias characteristic and the capacitance-temperature characteristic by methods explained below.

Specific Permittivity ($\epsilon_r$)

An electrostatic capacity C of the capacitor samples was measured under conditions of the reference temperature of 20° C., a frequency of 1 kHz, and an input signal level (measurement voltage) of 1 Vrms/μm by using a digital LCR meter (YHP4284 made by Yokogawa Electric Corporation). Then, the obtained electrostatic capacity, a dielectric thickness of the multilayer ceramic capacitor, and a superimposing area of internal electrodes were used for calculating the specific permittivity (there is no unit). The results are shown in Table 2 and Table 4.

Short-Circuiting Defective Rate

The short-circuiting defective rate was obtained by performing conduction check by a tester by using 80 capacitor samples. Those with a resistance value of 10 Ω or less were judged to be short-circuiting defective and the defective number was obtained, then, the percentage (%) with respect to the whole number was calculated. The results are shown in Table 2 and Table 4.

DC Bias Characteristic

Changes of the electrostatic capacity (the unit is %) were calculated while gradually applying a direct-current voltage to the capacitor samples at a constant temperature (20° C.). The results at 2 V/μm were shown in Table 2 and Table 4.

Temperature Characteristic of Electrostatic Capacity

An electrostatic capacity was measured in a temperature range of −55 to 125° C. on the capacitor samples, and change rates ΔC (the unit is %) of the electrostatic capacity at −55° C., −25° C., 85° C. and 125° C. with respect to that at +20° C. were calculated. The results are shown in Table 2 and Table 4.

TABLE 1

| Sample No. | | Specific Surface Area of $BaTiO_3$ Material ($m^2/g$) | MgO (mol) | MnO (mol) | $Y_2O_3$ (mol) | $V_2O_5$ (mol) | (Ba, Ca)$SiO_3$ (mol) | Dielectric Thickness (μm) | Average Particle Diameter (μm) | Average Particle Number |
|---|---|---|---|---|---|---|---|---|---|---|
| 1 | Comparative Example | 11.59 | 0.5 | 0.2 | 2 | 0.03 | 3 | 1.30 | 0.211 | 6.17 |
| 2 | Example | 4.53 | 0.5 | 0.2 | 2 | 0.03 | 3 | 1.46 | 0.264 | 5.53 |
| 3 | Example | 3.72 | 0.5 | 0.2 | 2 | 0.03 | 3 | 1.84 | 0.344 | 5.34 |
| 4 | Example | 3.72 | 0.5 | 0.2 | 2 | 0.03 | 3 | 1.21 | 0.352 | 3.44 |

TABLE 1-continued

| Sample No. | | Specific Surface Area of BaTiO$_3$ Material (m$^2$/g) | MgO (mol) | MnO (mol) | Y$_2$O$_3$ (mol) | V$_2$O$_5$ (mol) | (Ba, Ca)SiO$_3$ (mol) | Dielectric Thickness (μm) | Average Particle Diameter (μm) | Average Particle Number |
|---|---|---|---|---|---|---|---|---|---|---|
| 5 | Example | 4.53 | 0.3 | 0.2 | 2 | 0.03 | 3 | 1.36 | 0.282 | 4.84 |
| 6 | Example | 3.72 | 0.1 | 0.2 | 2 | 0.03 | 3 | 1.80 | 0.386 | 4.66 |
| 7 | Example | 3.72 | 0.1 | 0.2 | 2 | 0.03 | 3 | 1.25 | 0.395 | 3.17 |
| 8 | Comparative Example | 3.25 | 0.5 | 0.2 | 2 | 0.03 | 3 | 1.15 | 0.430 | 2.67 |

TABLE 2

| Sample No. | | Average Particle Number | Specific Dielectric Permittivity | Short-Circuiting Defective Rate (%) | DC Bias Characteristic (%) | Temperature Characteristic of Electrostatic Capacity | | | |
|---|---|---|---|---|---|---|---|---|---|
| | | | | | | −55° C. (%) | −25° C. (%) | 85° C. (%) | 125° C. (%) |
| 1 | Comparative Example | 6.17 | 1776 | 23 | −21.36 | −7.032 | −2.846 | −6.994 | −29.138 |
| 2 | Example | 5.53 | 2315 | 5 | −12.13 | −3.059 | −1.122 | −8.024 | −15.309 |
| 3 | Example | 5.34 | 2204 | 21 | −14.13 | −6.191 | −4.560 | −6.514 | −16.154 |
| 4 | Example | 3.44 | 2308 | 26 | −16.77 | −7.138 | −4.286 | −7.161 | −18.310 |
| 5 | Example | 4.84 | 2367 | 28 | −13.96 | −6.312 | −3.509 | −6.204 | −14.642 |
| 6 | Example | 4.66 | 2294 | 33 | −17.02 | −10.019 | −6.452 | 2.143 | −6.269 |
| 7 | Example | 3.17 | 2588 | 59 | −21.61 | −9.241 | −5.499 | 0.175 | −8.781 |
| 8 | Comparative Example | 2.67 | — | 100 | — | — | — | — | — |

Table 1 shows the specific surface areas of BaTiO$_3$ materials, adding quantities of the respective subcomponents, thicknesses of the dielectric layer, average particle diameters of the dielectric particles, and average particle numbers per one dielectric layer of samples 1 to 8. Also, Table 2 shows the average particle numbers per one dielectric layer and respective electric characteristics of the samples 1 to 8.

From Table 1, all of the samples 1 to 8 have the dielectric layer thickness of 2.0 μm or less. The average particle number per one dielectric layer was 3 or more and 6 or less in the example samples 2 to 7, while more than 6 in the comparative example samples 1 and less than 3 in the comparative example samples 8.

According to Table 2, all of the samples 2 to 7 of the examples of the present invention exhibited high specific permittivity. Also, the short-circuiting defective rate, the DC bias characteristic and temperature characteristic of the electrostatic capacity were also preferable. Particularly, the result of the temperature characteristic of the electrostatic capacity satisfied the B characteristic [the capacitance change rate was within ±10% in −25 to 85° C. (the reference temperature was 20° C.)] and the X5R characteristic [the capacitance change rate was within ±15% in −55 to 85° C. (the reference temperature was 20° C.)].

On the other hand, the comparative example samples 1 wherein the average particle number per one dielectric layer was 6.167 exhibited a low specific permittivity as less than 2000. The comparative example samples 8 wherein the average particle number per one dielectric layer was 2.674 exhibited the short-circuiting defective rate of 100%, and no sample capable of serving as a capacitor was obtained. Therefore, other electric characteristics than the short-circuiting defective rate were not able to be measured on these samples.

It was confirmed from the results that, even when the dielectric layer was made to be thin, for example, to 2.0 μm, the average particle number per one dielectric layer was preferably 3 or more and 6 or less to suppress the short-circuiting defective rate and improve the specific permittivity.

Also, from the Table 1 and Table 2, samples 6 and 7 wherein the adding quantity of MgO was 0.1 mole exhibited particularly preferable temperature characteristic at 125° C. comparing with those in the samples 2 to 5 wherein the adding quantities of MgO were 0.5 and 0.3 mole. As a result, it was confirmed that a content of the Mg oxide was preferably 0.1 to 3 moles, more preferably 0.1 to 0.5 mole, and furthermore preferably 0.1 to 0.3 mole in terms of MgO with respect to 100 moles of the main components.

TABLE 3

| Sample No. | | Specific Surface Area of BaTiO$_3$ Material (m$^2$/g) | MgO (mol) | MnO (mol) | Y$_2$O$_3$ (mol) | V$_2$O$_5$ (mol) | (Ba, Ca)SiO$_3$ (mol) | Dielectric Thickness (μm) | Average Particle Diameter (μm) | Average Particle Number |
|---|---|---|---|---|---|---|---|---|---|---|
| 2 | Example | 4.53 | 0.5 | 0.2 | 2 | 0.03 | 3 | 1.46 | 0.264 | 5.53 |
| 9 | Comparative Example | 3.72 | 0.1 | 0.2 | 0.5 | 0.03 | 2 | 3.40 | 0.569 | 5.98 |

TABLE 3-continued

| Sample No. | | Specific Surface Area of BaTiO$_3$ Material (m$^2$/g) | MgO (mol) | MnO (mol) | Y$_2$O$_3$ (mol) | V$_2$O$_5$ (mol) | (Ba, Ca)SiO$_3$ (mol) | Dielectric Thickness (μm) | Average Particle Diameter (μm) | Average Particle Number |
|---|---|---|---|---|---|---|---|---|---|---|
| 10 | Comparative Example | 3.90 | 0.1 | 0.2 | 1 | 0.03 | 1 | 3.40 | 0.619 | 5.49 |

TABLE 4

| Sample No. | | Dielectric Thickness (μm) | Specific Dielectric Permittivity | Short-Circuiting Defective Rate (%) | DC Bias Characteristic (%) | Temperature Characteristic of Electrostatic Capacity | |
|---|---|---|---|---|---|---|---|
| | | | | | | −25° C. (%) | 85° C. (%) |
| 2 | Example | 1.46 | 2315 | 5 | −12.13 | −1.122 | −8.024 |
| 9 | Comparative Example | 3.40 | 4119 | 5 | −35.84 | −3.304 | 0.307 |
| 10 | Comparative Example | 3.40 | 3582 | 13 | −30.86 | −4.131 | −0.042 |

Table 3 shows the specific surface areas of BaTiO$_3$ materials, adding quantities of respective subcomponents, dielectric layer thicknesses, average particle diameters of the dielectric particles, and average particle numbers per one dielectric layer of the samples 2, 9 and 10. Also, Table 4 shows dielectric layer thicknesses and the respective electric characteristics of the samples 2, 9 and 10.

According to Table 3, the comparative example samples 9 and 10 had average particle numbers per one dielectric layer within that of the present invention, but had the dielectric layer thickness of 3.4 μm, which is out of the range of the present invention. Note that contents of subcomponents in the comparative example samples 9 were within the preferable range of the present invention.

According to Table 4, the comparative example samples 9 and 10 wherein the dielectric layer thicknesses were thick as 3.4 μm had the DC bias characteristic exceeding −30%, which was poorer comparing with that in the example samples 2. Furthermore, the comparative example samples 9 and 10 exhibited higher specific permittivity comparing with that in the example samples 2, but due to the thick dielectric layer, the electrostatic capacity of the multilayer ceramic capacitor itself cannot be improved. Consequently, it was confirmed that the average particle number per one dielectric layer was preferably 3 or more and 6 or less and the dielectric layer thickness was preferably 2.0 μm, and more preferably 1.5 μm or less.

What is claimed is:

1. A multilayer ceramic capacitor having internal electrode layers and dielectric layers, wherein a thickness of said dielectric layer is 2.0 μm or less, and an average particle number per one dielectric layer obtained by dividing the thickness of said dielectric layer by an average particle diameter of dielectric particles composing said dielectric layer is in a range of 3 to 6, wherein said dielectric layer includes a main component containing barium titanate; and 0.1 to 3 moles of an oxide of Mg in terms of MgO, 0 to 0.5 mole of an oxide of Mn in terms of MnO, 0 to 0.5 mole of an oxide of V in terms of V$_2$O$_5$, 0 to 5 moles of an oxide of Y in terms of Y$_2$O$_3$, 2 to 12 moles of an oxide of Si in terms of SiO$_2$, and 2 to 12 moles of oxides of Ba and Ca in terms of (BaO+CaO) as subcomponents with respect to 100 moles of said main component.

2. The multilayer ceramic capacitor as set forth in claim 1, wherein 0.1 to 0.5 mole of the oxide of Mg in terms of MgO is included in the dielectric layer.

3. The multilayer ceramic capacitor as set forth in claim 2, wherein 0.1 to 0.3 mole of the oxide of Mg in terms of MgO is included in the dielectric layer.

4. The multilayer ceramic capacitor as set forth in claim 1, wherein said dielectric layer is produced by using as a material barium titanate powder having a specific surface area of 3 m$^2$/g to 10 m$^2$/g.

5. The multilayer ceramic capacitor as set forth in claim 2, wherein said dielectric layer is produced by using as a material barium titanate powder having a specific surface area of 3 m$^2$/g to 10 m$^2$/g.

6. The multilayer ceramic capacitor as set forth in claim 3, wherein said dielectric layer is produced by using as a material barium titanate powder having a specific surface area of 3 m$^2$/g to 10 m$^2$/g.

7. A multilayer ceramic capacitor having internal electrode layers and dielectric layers, wherein a thickness of said dielectric layer is 2.0 μm or less, and an average particle number per one dielectric layer obtained by dividing the thickness of said dielectric layer by an average particle diameter of dielectric particles composing said dielectric layer is in a range of 3 to 6, wherein said dielectric layer includes a main component containing barium titanate; and 0.1 to 3 moles of an oxide of Mg in terms of MgO, 2 to 12 moles of an oxide of Si in terms of SiO$_2$, and 2 to 12 moles of oxides of Ba and Ca in terms of(BaO+CaO) as subcomponents with respect to 100 moles of said main component.

8. The multilayer ceramic capacitor as set forth in claim 7, wherein 0.1 to 0.5 mole of the oxide of Mg in terms of MgO is included in the dielectric layer.

9. The multilayer ceramic capacitor as set forth in claim 8, wherein 0.1 to 0.3 mole of the oxide of Mg in terms of MgO is included in the dielectric layer.

10. The multilayer ceramic capacitor as set forth in claim 7, wherein said dielectric layer is produced by using as a material barium titanate powder having a specific surface area of 3 $m^2/g$ to 10 $m^2/g$.

11. The multilayer ceramic capacitor as set forth in claim 8, wherein said dielectric layer is produced by using as a material barium titanate powder having a specific surface area of 3 $m^2/g$ to 10 $m^2/g$.

12. The multilayer ceramic capacitor as set forth in claim 9, wherein said dielectric layer is produced by using as a material barium titanate powder having a specific surface area of 3 $m^2/g$ to 10 $m^2/g$.

13. A multilayer ceramic capacitor having internal electrode layers and dielectric layers, wherein a thickness of said dielectric layer is 2.0 μm or less, and an average particle number per one dielectric layer obtained by dividing the thickness of said dielectric layer by an average particle diameter of dielectric particles composing said dielectric layer is in a range of 3 to 6, wherein said dielectric layer is produced by using as a material barium titanate powder having a specific surface area of 3 $m^2/g$ to 10 $m^2/g$.

* * * * *